Sept. 13, 1938.   J. W. BRYCE   2,129,645
PRINTING AND ACCOUNTING MACHINE
Filed Dec. 24, 1931   8 Sheets-Sheet 1
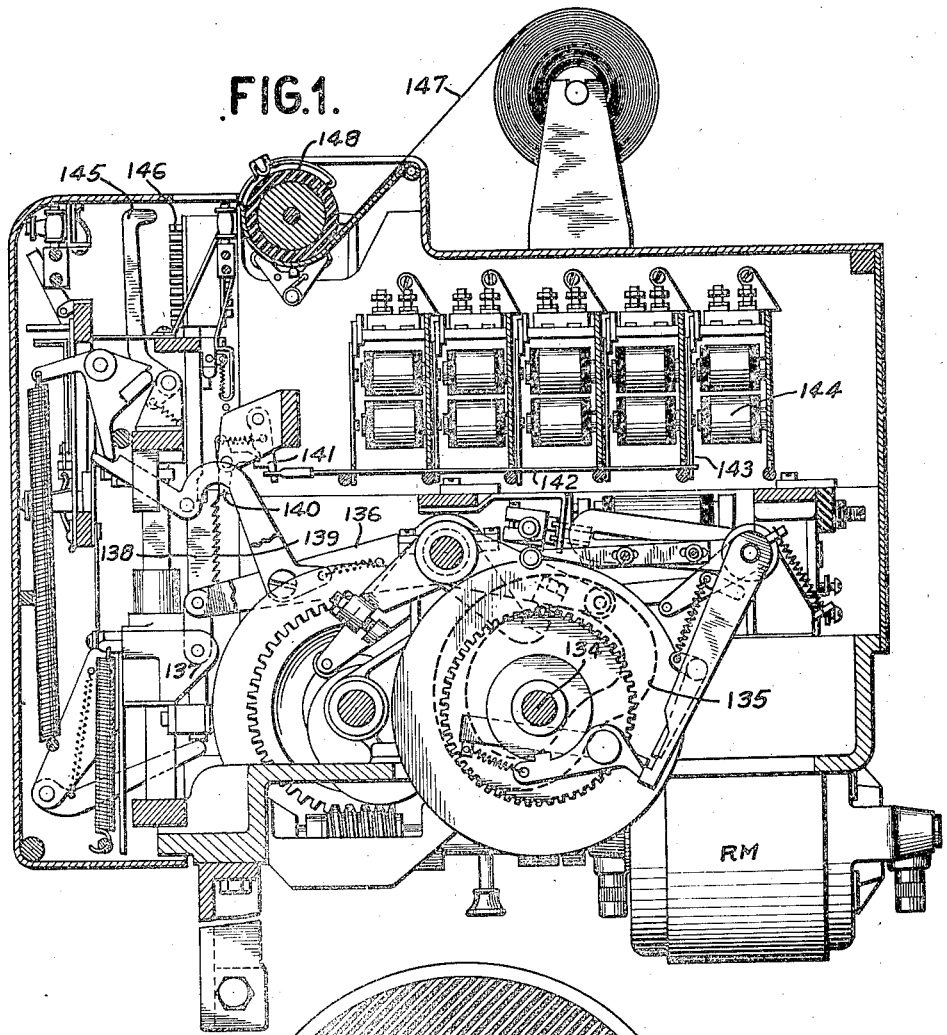
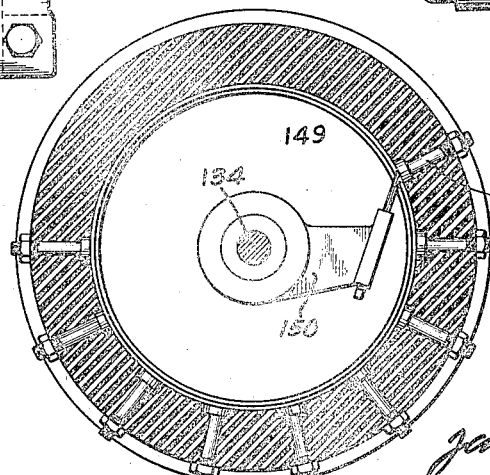
INVENTOR
James W. Bryce
BY ATTORNEY

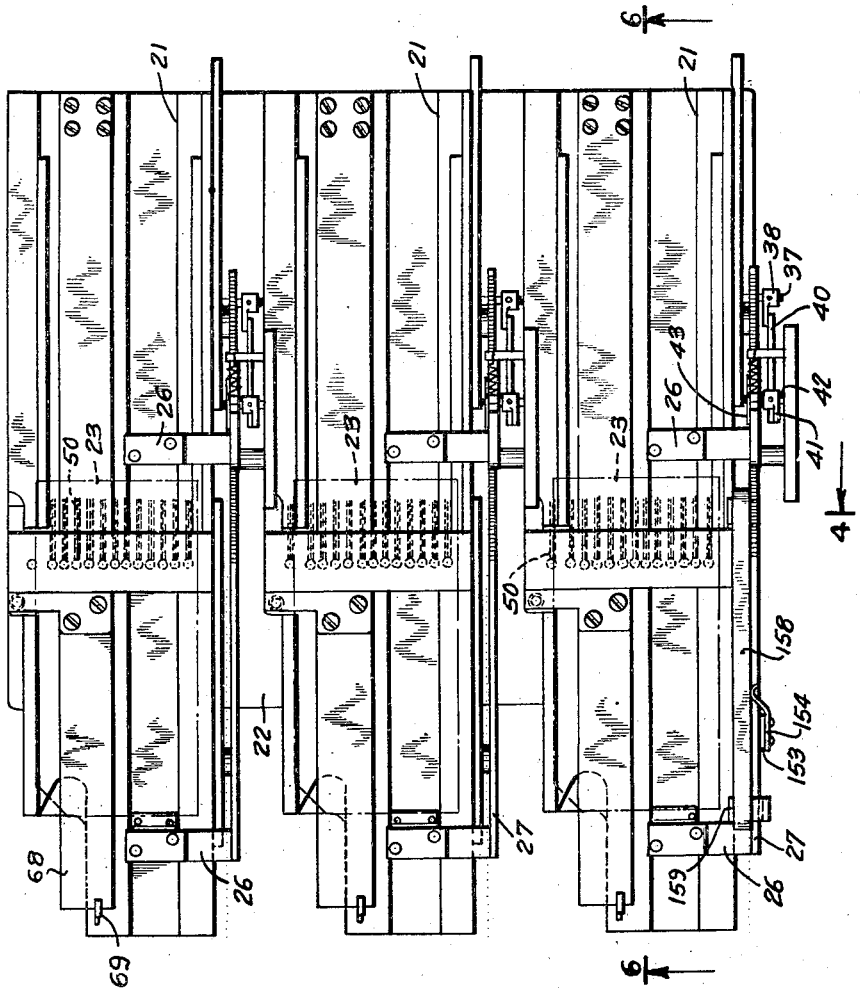

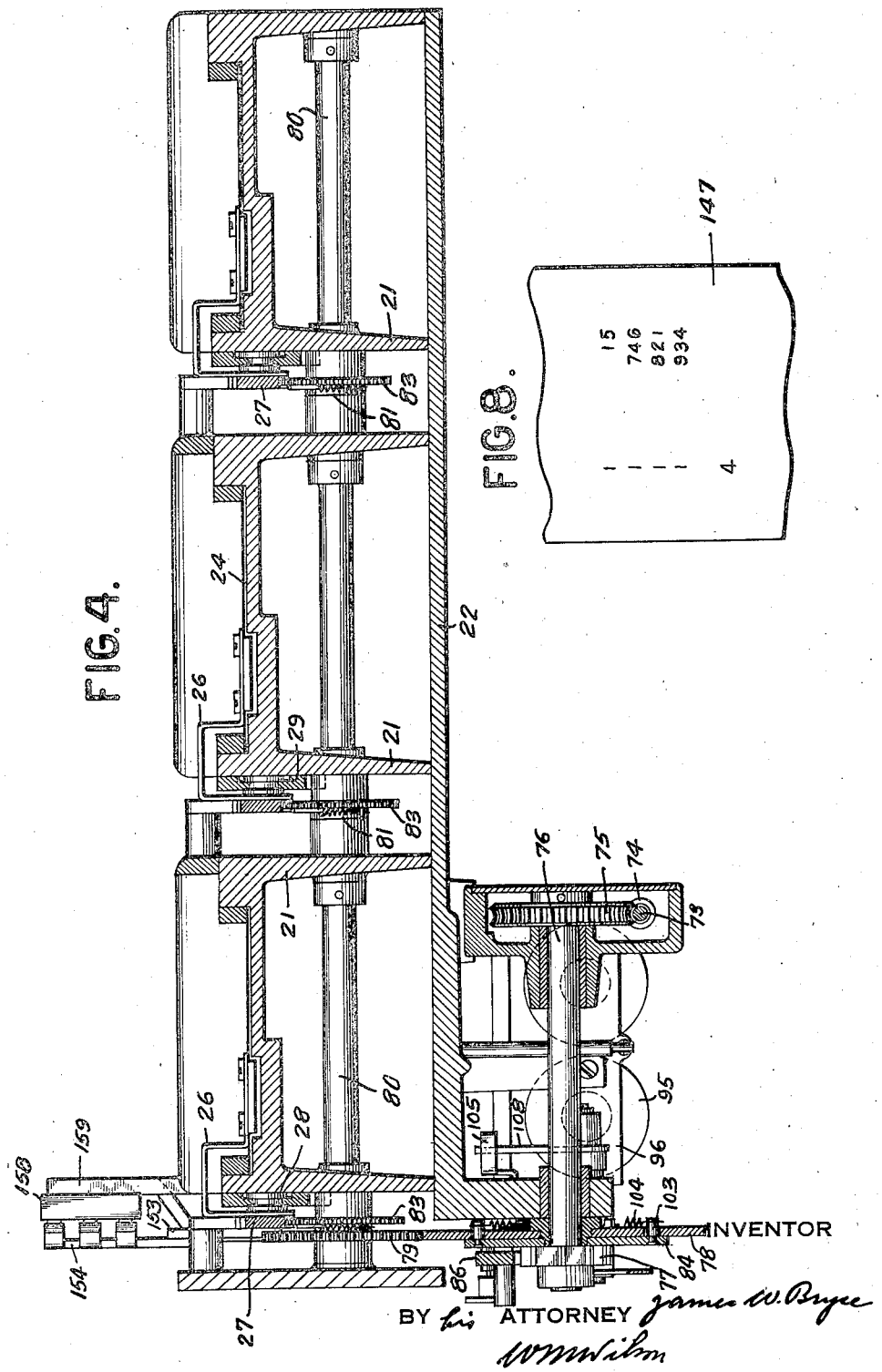

Sept. 13, 1938.  J. W. BRYCE  2,129,645
PRINTING AND ACCOUNTING MACHINE
Filed Dec. 24, 1931  8 Sheets-Sheet 4
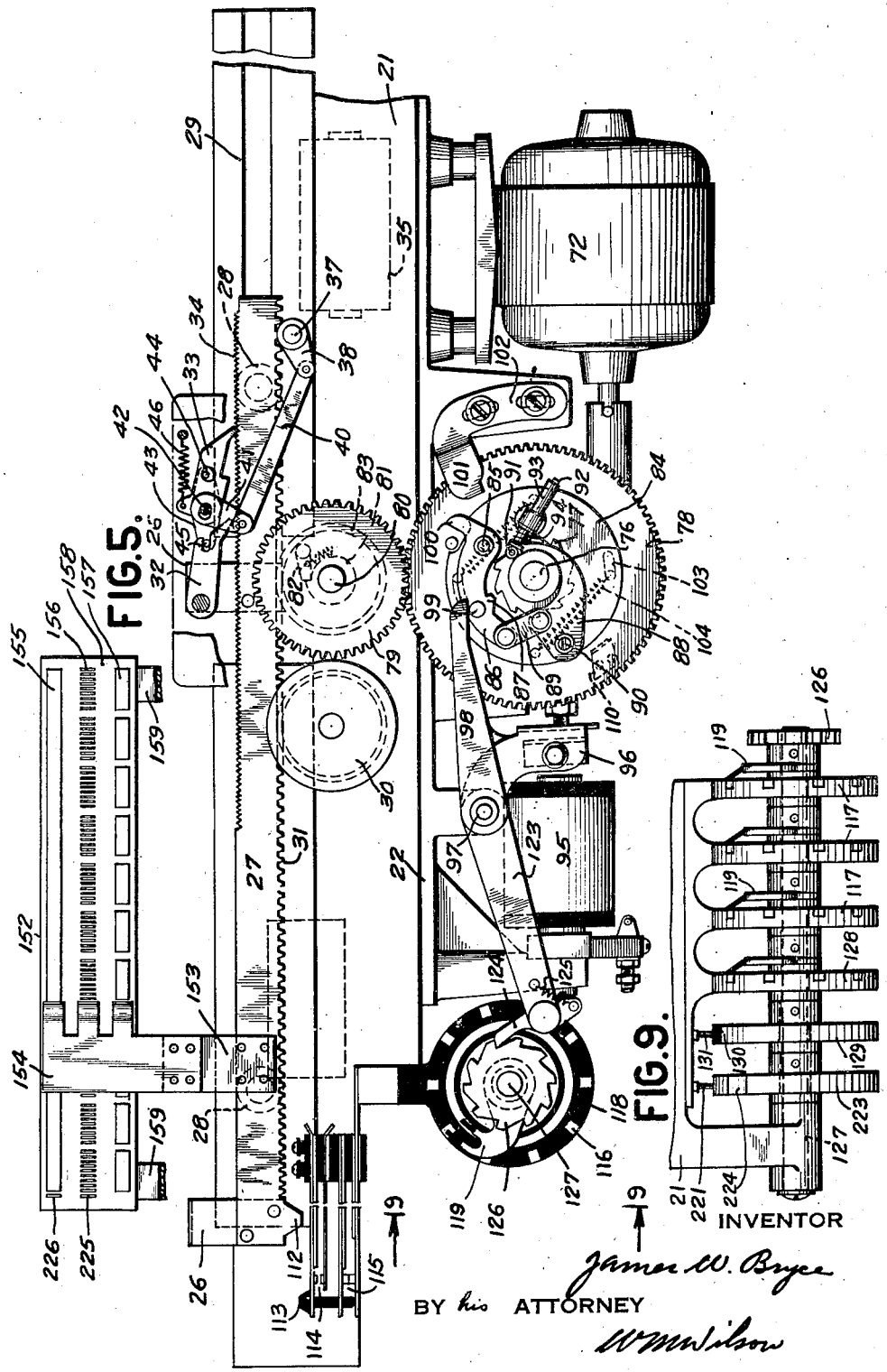

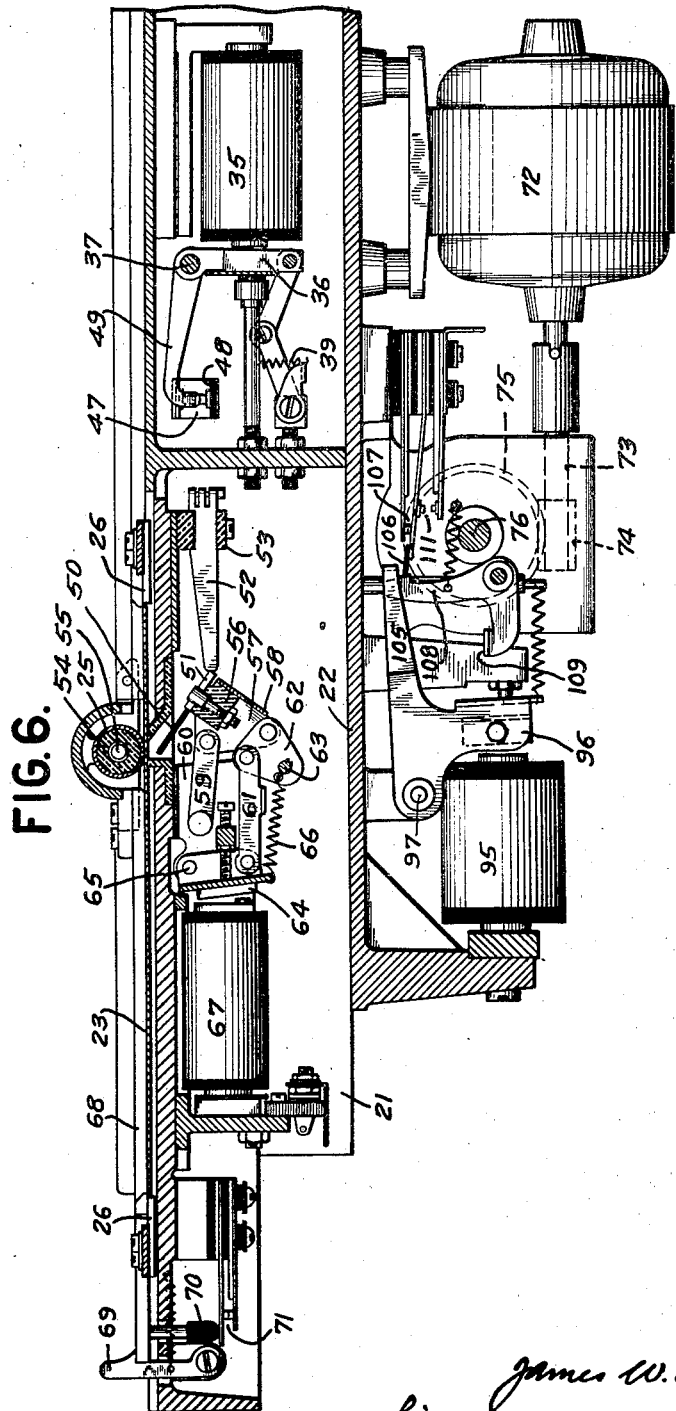

Sept. 13, 1938.  J. W. BRYCE  2,129,645
PRINTING AND ACCOUNTING MACHINE
Filed Dec. 24, 1931  8 Sheets-Sheet 6

INVENTOR
james W. Bryce
BY his ATTORNEY

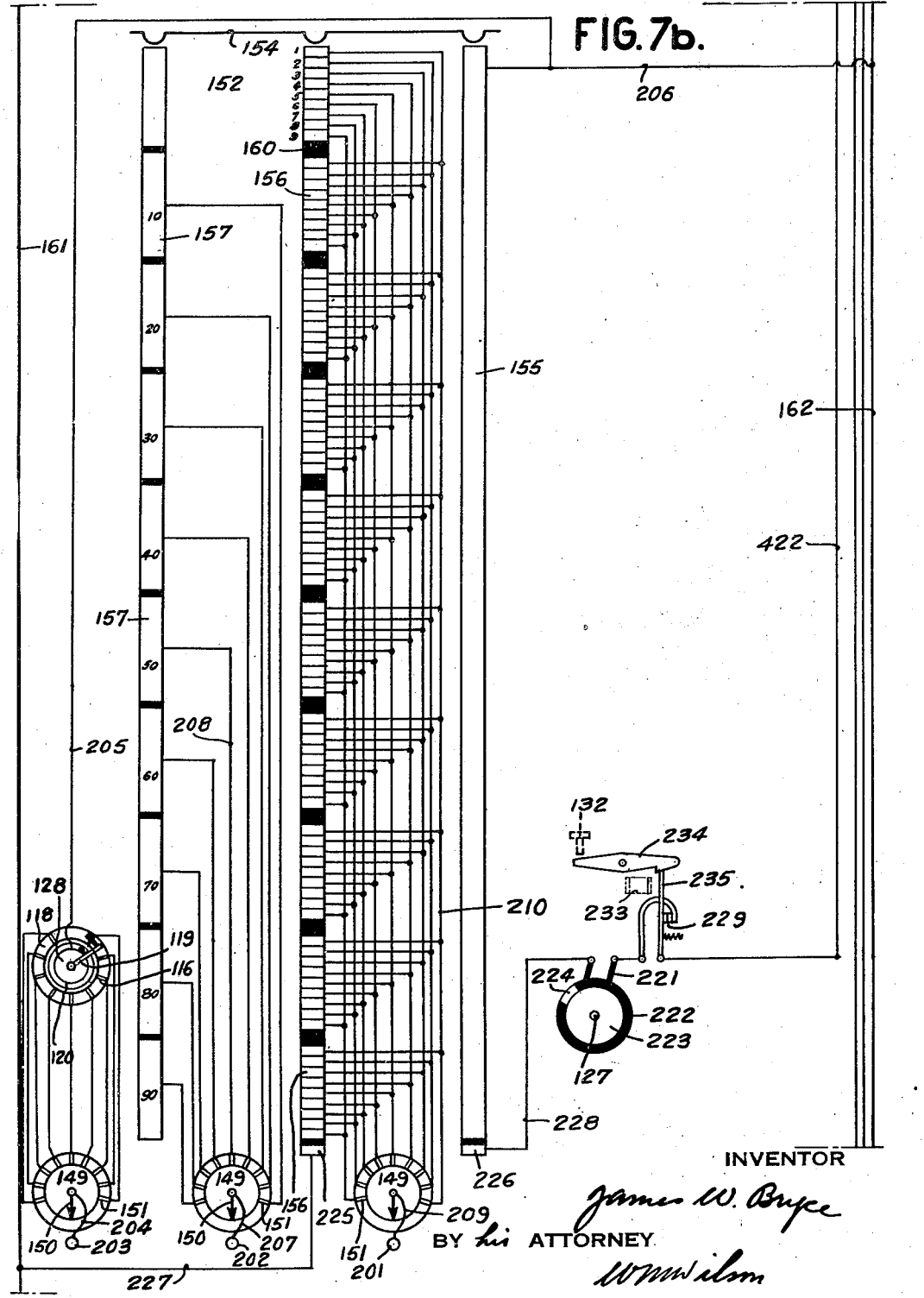

Sept. 13, 1938.  J. W. BRYCE  2,129,645
PRINTING AND ACCOUNTING MACHINE
Filed Dec. 24, 1931  8 Sheets—Sheet 8

INVENTOR
james W. Bryce
BY his ATTORNEY

Patented Sept. 13, 1938

2,129,645

UNITED STATES PATENT OFFICE 2,129,645

PRINTING AND ACCOUNTING MACHINE

James Wares Bryce, Bloomfield, N. J., assignor, by mesne assignments, to International Business Machines Corporation, New York, N. Y., a corporation of New York Application December 24, 1931, Serial No. 582,966

4 Claims. (Cl. 235—61.7)

The invention relates to counting and printing devices for recording the number and identification of agreeing data present on a plurality of records.

A divisional application Serial No. 593,740, filed February 18, 1932, is concerned with certain printing devices revealed herein.

An object of the invention is to provide means for comparing the perforations in a plurality of record or cross-index cards.

Another object is to provide devices for counting the number of times agreeing perforated index points appear on the records. The separate counts are accumulated and a printed record is made of the total.

A feature of the invention is the printing of a list of numbers identifying certain perforated points on record cards, and a printed numeral indicating the number of index points recorded.

A further object is to perform the entire comparing and recording operation automatically, the plurality of data cards being inserted in the machine and the starting circuit closed, the machine senses each column on all the cards at every index point in the columns concurrently. The sensing operation having been started, continues uninterruptedly until an agreement of indicia or perforations in the cards indicates the necessity for recording at what point in the sensing operation the agreement is had. The machine pauses in the sensing operation while this fact is recorded and counted, then the sensing is again automatically resumed. When the cards have been completely sensed, the total of number of times agreement was had is recorded and the machine stops and remains stopped until it is started by manual means.

Although it is apparent that the invention is adapted for use in many accounting and statistical systems, it is illustrated in the present disclosure in connection with an example concerning the use of a statistical system for the study of the occurrence of complications in disease. In other words, having a certain disease present in a case, what is the probability of one or more other diseases being present in the same case.

To gather the facts from a large number of cases a set of disease cards, one for each disease, is perforated in accordance with the routine records concerning each case. The perforation of the cards is carried on in a punching machine separate from the devices of the present invention. Ten disease record cards may be perforated, each having one hundred columns of index points with ten index points in a column thus providing space for the perforation registration of one thousand cases.

Reading the disease card from left to right, the columns of index points are numbered 0 to 99 inclusive. The vertical or row positions in each column are numbered the same as the usual Hollerith card, i. e., "0" at the top of the column and "9" at the bottom. The horizontal rows of index points on the card are designed to represent hundreds identification. From the above it may be gathered that if a hole is punched at 0 in the thirty-sixth column, it represents 35 and may be so recorded. If, however, a hole is punched in the thirty-sixth column in the fifth index point position, it will represent 535 and may be so recorded. It will thus be apparent that one thousand numbers may be represented each by a hole perforated in the cross index card.

When a certain case is complicated with two or more diseases, the related disease cards are perforated in the same index point position. After the data relating to all the cases has been transferred to the set of cross index cards, any combination of such cards can be compared to determine the number and identification of the cases having the complications studied. The comparing and recording of the cases meeting the requirements set could be accomplished by hand but it would be a long and tedious operation. This comparing and recording operation is performed quickly and accurately by the devices of the present invention. A printed record is produced upon which is indicated the total number of cases in which the combination of diseases studied occurred, and a list of numbers identifying the cases.

In the preferred form disclosed, the comparing and recording device consists of a plurality of receivers each adapted to receive one index card and each receiver being equipped with a card sensing device. These plurality of card receiving devices are connected to a tabulating machine type of mechanism. The tabulator is equipped with one or more adding counters and a printing mechanism adapted to print a plurality of numerals, said printing mechanism being under control of the cross-index card being sensed through an intermediate set of differential timing contactors. In the use of the device, two or more index cards may be inserted for comparison at any one time. The sensing devices consist of a plurality of sets of brushes connected in an electric circuit, one set engaging the surface of each record card. The brushes are connected in series. In the sensing operation the cards move so that the brushes sense the card from left to right starting on the 0 position of each horizontal row.

The cards, as stated, are mounted in receivers each under the control of a card shifting equipment similar to that used in an electrical punch disclosed in the application of F. Lee et al., Serial No. 391,874, filed September 11, 1929, corresponding to British Patent No. 362,529. The cards are stepped along column by column by means of an escapement and the brushes detect by the closing of the circuit the presence of corresponding holes in all of the cards sensed. By means of a commutator connection only one brush of a set is effective during a sensing operation, the sensing of the top row of the card being effective first and the brushes sensing the other rows being made effective in succession from the top to the bottom brush in the set. The entire card is sensed from left to right. After the sensing of the top or zero horizontal row of index points on the card, the card returns so that the brushes are again at the left hand end of the card and are made effective to sense the horizontal row marked "1", that is the index points representing 100 to 199. Again the cards are moved and sensed from left to right, this operation continuing until the ten horizontal rows have been detected.

If at any point in the movement of the card over the brushes a corresponding hole in each card is detected, a circuit is closed through all of the brushes. This, through the instrumentality of a relay, causes the sensing operation to be suspended and another circuit to be closed to cause the tabulator to go through an adding and recording cycle. Intermediate contact devices that are positioned along with the cards determine the value of the particular hole sensed and in turn energize emitters moving in synchronism with the tabulator printing devices, thus causing the tabulator to record the identification of the perforation sensed by printing of a record sheet.

In the printing cycle the tabulator also adds a unit to an adding counter each time such agreement is reached. This counter accumulates all the units resulting from such agreement and carries a total representing the number of agreeing cases.

The electric circuits are so arranged that the completion of the adding and printing cycle on the part of the tabulator releases the relay above mentioned and causes the re-initiation of card comparing. This operation continues until the last position on the cards is sensed. At that point, a total from the counter is automatically taken and printed on the same sheet with the list of identification numbers and the counter is either reset or not in accordance with the wishes of the operator.

In the ordinary use of the machine the index cards may then be withdrawn and another set inserted for comparison, the new set being either wholly new or comprising possibly one or more records already compared. Thus the comparison of data on an unlimited number of cross index record cards is made possible.

A set of drawings accompany the specification and form part of the disclosure.

In the drawings:

Fig. 1 is a sectional elevation view of the tabulator, showing the construction of the printing mechanism.

Fig. 2 is a detail sectional view of a contacting device which is operated in synchronism with the elevation of a type member for energizing the stopping devices to hold the type bar in any one of its printing positions.

Fig. 3 is a plan view of the cross index card receivers.

Fig. 4 is a sectional end view taken along the line 4—4 in Fig. 3, showing the construction of the card receivers and card return clutch devices.

Fig. 5 is a front elevational view of the card receivers showing the escapement mechanism, the card return clutch, and the commutator stepping devices.

Fig. 6 is a sectional elevational view taken along line 6—6 in Fig. 3, showing the card sensing brushes, the escapement operating magnet and other contact operating means.

Figure 7B:
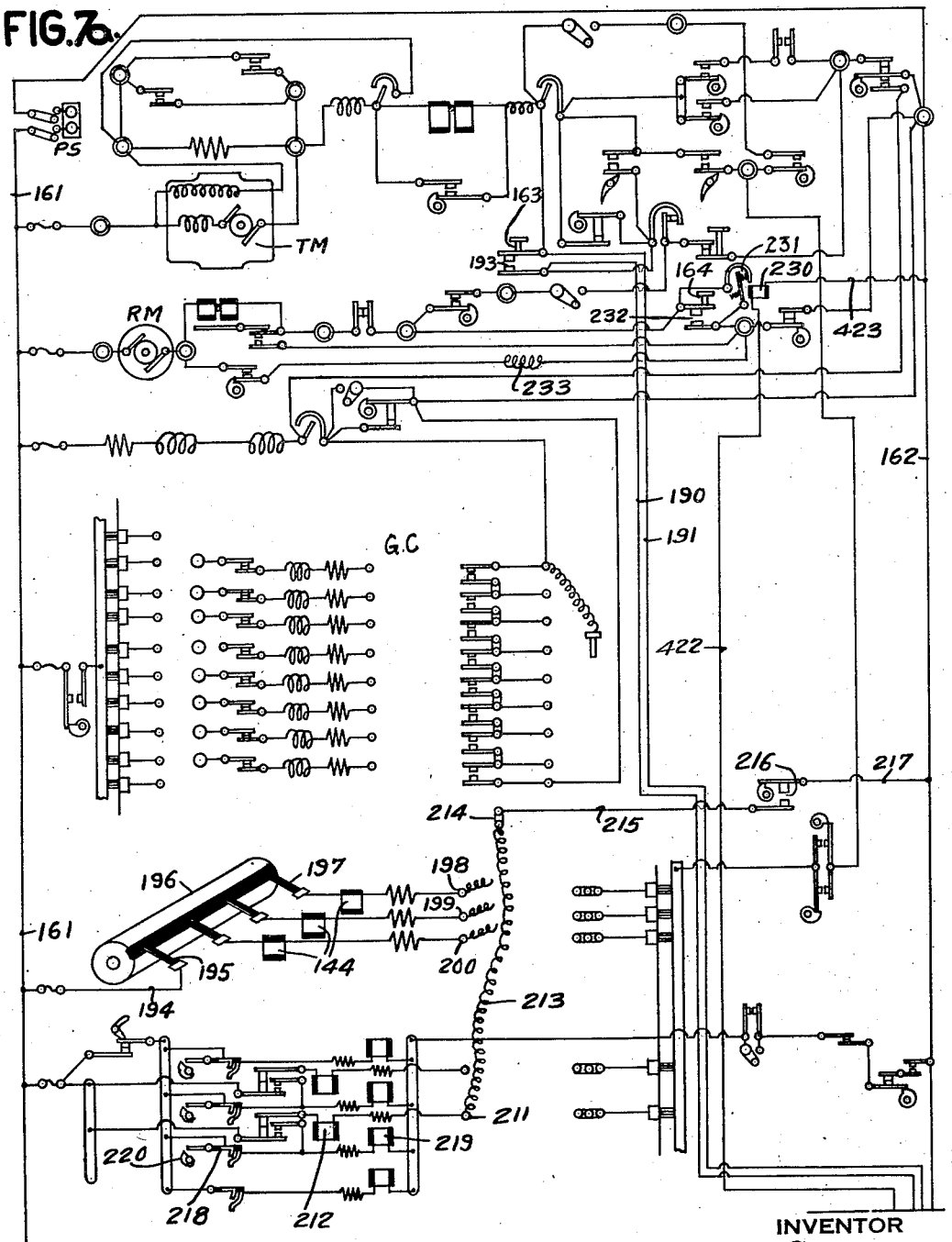
Figure 7C:
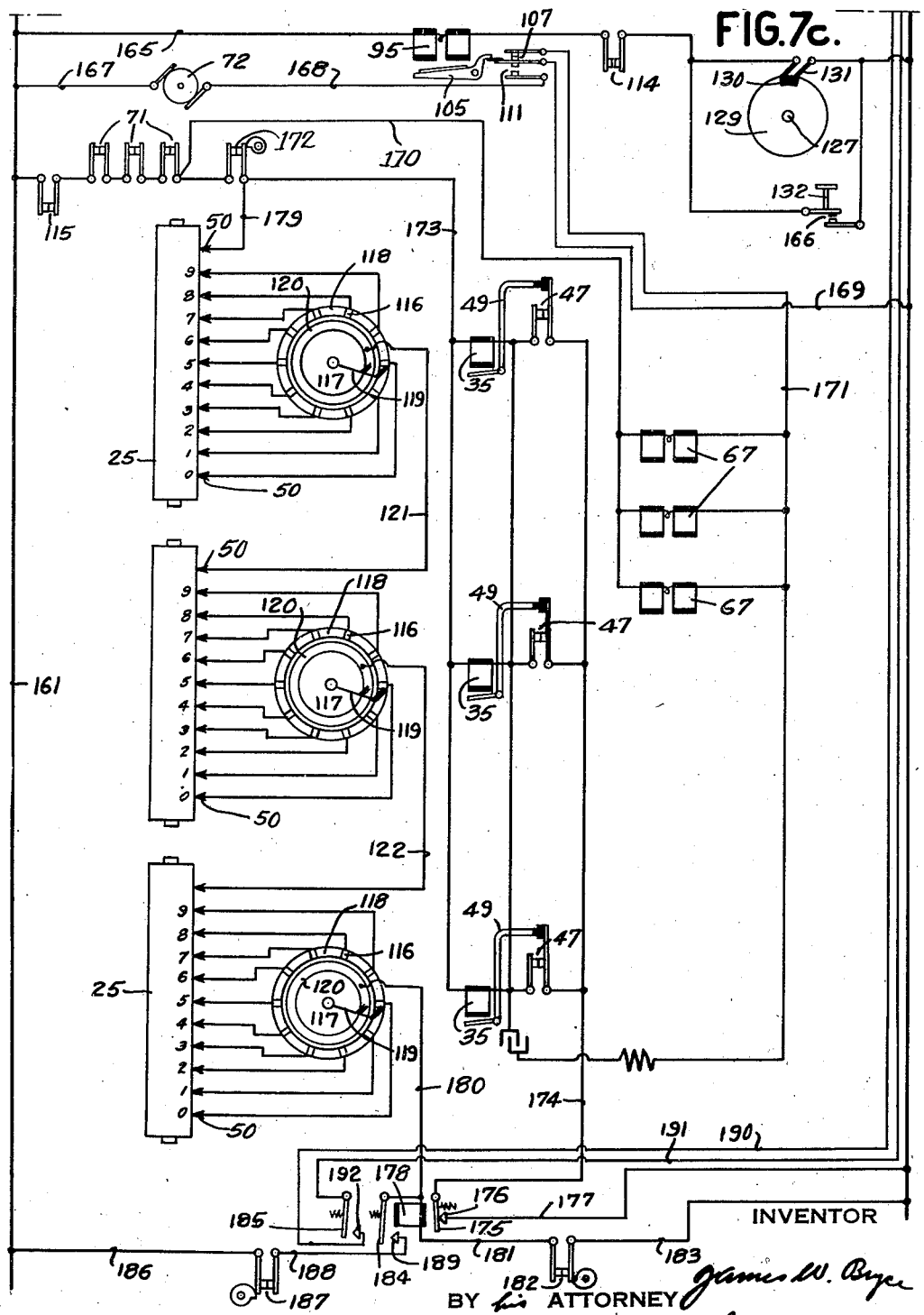

Figs. 7a, 7b, and 7c together form a wiring diagram of the machine.

Fig. 8 is an example of the printed sheet produced by the machine.

Fig. 9 is a detail view in side elevation taken as indicated by line 9—9 in Fig. 5, and showing the construction of the commutator disks and brush holders which are advanced step by step by the card return mechanism.

The machine, as shown in Fig. 3, is provided with three card receivers. The number of card receivers may be increased to compare a larger number of cards in combination, by merely adding other card frames 21. As these card receivers are alike in structure, a description of one applies to the others as well. The card frames 21 are mounted on a common base 22. When a card 23 is inserted in a frame it rests on a shoulder 24 (Fig. 4) with its left end leading under the sensing roller 25 (Fig. 6). Both ends of the card 23 are engaged by extension brackets 26 fixed to the card shifting escapement rack 27. From the side of the rack 27 there protrude two studs 28 which are held in a slot 29 in the frame, thus guiding the sliding movement of the rack. A spring drum 30 in engagement with rack teeth 31 on the bottom of rack 27 (Fig. 5) tends at all times to urge the rack to the left. A separate rack and escapement mechanism is provided for each card receiver.

A pair of escapement pawls 32, 33 cooperate with a series of teeth 34 cut in the top of slide rack 27. Enough teeth are provided to stop the rack and the card it controls in one hundred different positions, each position presenting one column of index points on the card for sensing. The escapement mechanism is controlled by a magnet 35 (Fig. 6) mounted within the card frame 21. The armature 36 of the magnet is secured to a shaft 37 which projects out of the card frame (Fig. 5) and has secured to its end, an arm 38. A spring 39 normally tends to hold the armature 36 away from the magnet 35. The arm 38 is connected by a link 40 to a crank 41 fixed on a shaft 42 to which is attached a two armed lever 43. The lever is rocked in a counter-clockwise direction when magnet 35 is energized; and when so rocked, a pin 44 on one arm of the lever lifts pawl 33 while a pin 45 on the other arm of the lever lowers the pawl 32 into engagement with the teeth 34 on rack 27, so that pawl 33 when lowered by the return movement of lever 43 will engage the next tooth to the right on the rack. The enlarged opening in pawl 33 into which pin 44 protrudes, allows a return movement of the rack to the right, Fig. 5, a spring 46 attached to pawl 33 yieldingly urging the pawl into cooperation with the rack at all times.

A pair of contacts 47 wired in series with the associated magnet 35 are mounted adjacent the magnet as shown in Fig. 6. To one of the contact blades is fixed an insulation block 48 which is in the path of the end of an arm 49 fixed to shaft 37. When magnet 35 is energized arm 49 is rocked and acts to open contacts 47, thus breaking the circuit through the magnet 35, deenergizing it and allowing shaft 37 to return to normal position, whereupon contacts 47 are again closed to energize the magnet.

Thus the magnet 35 is alternately energized and deenergized, causing the escapement mechanism to function to permit column by column shifting of the record card. This continues until coinciding perforations are sensed in the record cards; then devices, to be described hereinafter in connection with the wiring diagram, act to break the circuit through all the magnets for a moment while the index number of the perforation is recorded, after which the card shifting operation is again resumed.

The record card perforation sensing devices are shown in Fig. 6. There it is noted that electrical connections to the movable sensing brushes 50 are established by contact between the mounting blocks 51 of the brushes and stationary spring contact plates 52. The series of contact plates 52 are carried by a block of insulating material 53 fixed to the card frame.

Each spring 52 is adapted for continuous sliding electrical contact with the associated brush holder or block 51 which carries its particular analyzing brush 50. The series of brushes 50, of which there are eleven, are adapted to bear against a metal cylinder or roller 25 mounted on a non-conducting roller 54 which is carried by a shaft 55. The brushes 50 are carried by an insulating brush holder 56 secured between a pair of side plates 57 of a yoke or bail shaped member designated generally by reference numeral 58. Each side plate 57 of the yoke shaped frame 58 is suspended or supported at its upper end by a link 59 pivoted to the frame portion 60 and at its lower end the plates 57 are supported by means of a parallel link 61. Intermediate each plate 57 and related link 61 is a toggle plate linkage member 62 which is pivoted upon a spring stud 63 securely fastened to the frame member 21.

The end of the link 61 distant from its connecting point to the toggle plate 62 is pivotally secured to an armature structure 64, the latter being pivoted at 65 to the frame member 60. The armature structure 64 is attracted against the tension of a spring 66 when magnet 67 is energized, at which time the counterclockwise rocking movement of each toggle plate 62 about its pivotal point 63 will be effective to elevate the frame 58 resulting in the contact of the individual analyzing brushes 50 with the contact roll 25.

The brush holder 56 and analyzing brushes 50 extend completely across the card frame, and when a card 23 is in the frame it will pass between the roller 25 and all of the brushes 50 except the top one, as shown in Fig. 7c, which brush is in continuous contact with the contact roller 25.

Associated with each card table is a resilient plate 68, Fig. 6, adapted to be held down by a latch 69 during normal operation. When the latch is released and the plate 68 elevated a card may be placed upon the card carriage. Attached to the plate 68 is a contact operating member 70 adapted to engage and close contacts 71 when the plate is latched. Upon elevation of the latter to place a card on the carriage table, contacts 71 will open and since they are in series connection with the magnet 67 (see Fig. 7c) the latter will be deenergized to cause a shifting of the brush holder 57 to its lowermost position to permit the card to be shifted on top of the card carriage without danger of damaging or bending the brushes 50.

A means is provided for automatically returning the card carriage racks 27 with the cards 23 to their normal starting position by power instead of by manual operation. Such an arrangement expedites operation of the machine and requires less attention on the part of the operator. The mechanical parts for obtaining this result will now be described followed by a description of the electrical controlling instrumentalities.

Secured to the underside of the base 22 of the machine is a motor 72 (Fig. 5) having a clutch connection to a stub shaft 73 to which is secured a worm wheel 74 (Fig. 4) in mesh with a worm gear 75 secured to a shaft 76 one end of which has secured thereto a ratchet shaped clutch element 77 (see Fig. 5). Loosely mounted on shaft 76 is a gear 78 meshing with a gear 79 secured to shaft 80. Also fixed to the shaft are three single tooth clutch bushings 81 in engagement with pawls 82 mounted on the sides of gears 83 which mesh with the teeth 31 on the underside of racks 77. Clockwise rotation of gear 79 serves to move racks 27 to the right back to the initial card sensing position. A disk 84 secured to the side of gear 78 acts as a driving connection between the clutch 77 and the gear.

Pivoted at 85 to disk 84 is an arm 86 having a clutch tooth 87. The free end of arm 86 is connected to a toggle plate 88 by a link 89, the end of toggle plate 88 distant from its pivot 90 being articulated at 91 to a rod 92. The rod is urged into position by a spring 94 and fits in an aperture in a pin 93 rotatably mounted on the disk 84. By virtue of this construction rod 92 and plate 88 act as a toggle, spring 94 acting to impositively hold tooth 87 in or out of engagement with the clutch teeth of ratchet wheel 77.

For the purpose of effecting the clutching action a magnet 95 is provided and when energized attracts an armature 96 pivoted at 97, so that an arm 98 engaging a pin 99 of arm 86 will rock the arm and place the tooth 87 in engagement with ratchet wheel 77. Through link 89 the toggle connection will be moved centrifugally with spring 94 acting to hold clutch tooth in engagement with the ratchet teeth. Gear 78 will thereupon be driven in a counterclockwise direction substantially a single revolution, shifting rack 27 to the right just as if it was caused by movement of a finger piece. This action will result in moving the card carriages so that the cards are brought opposite the initial sensing position.

At the termination of the counterclockwise movement of gear 78, a tail 100 of plate 86 will strike a projection 101 of a fixed plate 102 to effect the disengagement of the tooth 87 and ratchet wheel 77 by a reverse action. The operation of the toggle back over dead center will cause the tooth 87 to be retained out of engagement with the teeth of the ratchet wheel 77.

Plate 84 is preferably mounted on gear 78 by pin and slot connections 103 (Fig. 5) and connected to each other for driving movement by springs 104. This construction is provided to take up the shocks due to starting from a position of rest and the sudden stopping of the rotation of gear 78.

Also secured to the pivot 97 of armature 96 is an arm 105 (Fig. 6) the free end of which is adapted to bear upon an insulating block 106 to open contacts 107 when magnet 95 is energized. Contacts 107 are retained opened by a latching bell crank 108 a lug 109 of which is adapted to be struck at the termination of the driving movement of the gear 78 by a bent up plate 110 (Fig. 5) secured to the latter. Contacts 107 as indicated in Fig. 7c are interposed in the circuit of brush magnets 67 so as to cause the lowering of brushes 50 during the power restoration of the card carriages; the circuit is closed at the termination thereof to provide for the contact of the brushes 50 with roller 25. Below contacts 107 are motor control contacts 111 which are latched closed upon an energization of magnet 95 to complete the circuit through motor 72 (see Fig. 7c) and are unlatched in the manner just described, to stop the motor at the termination of the driving operation.

When the card carriages move from the last column sensing position to the end of the escapement movement, two sets of contacts are operated; one set of contacts is closed to complete the circuit through the card return devices, and the other set is opened to disable card sensing and carriage escapement. For this purpose a projection 112 extending from the lower edge of rack 27 is adapted to cam an insulating pin 113 standing in its path. The pin overlies the upper contact blade of contacts 114 and the lower blade of contacts 115; the pin thus serving, when lowered, to close contacts 114 and open contacts 115. The functions of these contacts are more fully discussed hereinafter in an explanation of the wiring diagram.

The devices about to be described, serve to render the brushes 50 effective singly and in succession, the brush for the "0" row first, next the "1" row brush, etc. The commutator connections for selecting the brushes are shown in Fig. 7c. There it is noted that each brush 50 is wired to a separate contact segment 116 on the commutator 117 and each set of brushes is wired to a separate commutator section 118, the wires leading from the brushes being attached to the associated segments which are arranged in order about the section 118. A pivoted contact frame 119 (Fig. 9) in the commutator carries a pair of brushes that close the circuit between a common contact ring 120 and each of the segments. The brushes of the three sets are wired in series by connection wires 121 (Fig. 7c) and 122 between each ring 120 and the eleventh brush 50 contacting with contact roller 25. The frame 119 is adapted to be swung step by step about its pivot so that a circuit is established through the contact roller 25, any one of the brushes 50 in the "0" to "9" row, the corresponding segment 116, brushes in frame 119, then through ring 120 and back to the line. The object of this form of construction is to provide means for sensing only one row of index points on the cards at a time, and also to sense the rows in succession, starting with the "0" index row. The devices for moving the frames 119 are actuated after the last index point in a row is sensed. The card return mechanism already described serves to actuate the card sensing brush selection shift in a manner about to be described.

Attached to the armature 96, Fig. 5, at the pivot 97 is an arm 123 carrying a feed pawl 124. The pawl is urged by a spring 125 into cooperation with a ratchet wheel 126. The shaft 127 (Fig. 9) upon which the ratchet 126 is fixed also carries four frames 119, three of which cooperate with commutators 117 shown in Fig. 7c, and the other cooperates with a similar commutator 128 shown in Fig. 7b; the purpose of commutator 128 will be explained further on in the specification. Turning again to Figs. 5 and 7c it is noted that at the beginning of a card comparing operation the frames 119 stand in a position to close the card sensing circuit through the "0" row analyzing brushes 50. The frames 119 remain in this position during the movement of the cards until the last column of index points on the right side of the cards pass the brushes 50. Then, as already explained, magnet 95 is energized to operate the clutch and bring the cards back with the first column of index points to the left under the brushes. The movement of armature 96 carries along arm 123, and pawl 124 rotates ratchet 126 through one step of movement, placing frames 119 with the contact closed between the "1" segments and contact rings 120. The second row of index points on the cards is next compared as the cards are shifted under the brushes 50. The successive selection of brushes between the card sensing operations continues until the "9" brush or last row sensing circuit is selected, then the circuit through magnet 95 is broken by a disk 129 carried on shaft 127 and provided with an insulating segment 130 engaged by brushes 131 in circuit with the magnet. Thus, by reason of the break in the circuit, the card return mechanism is not operated after the sensing of the last row of index points on the cards. When a new card sensing operation is desired, after the insertion of a new set of cards in the receivers, the start key 132 (Fig. 7c) may be operated to close the circuit around brushes 131 and through magnet 95, the armature of which closes contacts 111 energizing motor 72 to effect a card return movement bringing the new set of cards into the initial sensing position.

The card shifting, sensing and return devices having been described above it is thought advisable at this point in the specification to give a general outline of the operation of the tabulating or printing mechanism before describing the connections between the card handling devices and the tabulator.

The tabulating mechanism shown in Fig. 1, and fully described in U. S. Patent No. 1,762,145 is adapted to be driven by the TM motor (Fig. 7a) which motor has connections for rotating a listing shaft 134 (Fig. 1) to which is attached a cam 135 for moving an arm 136 attached to the type bar lifting frame 137. The type bars 138 are lifted with a uniform motion, the notches 139 cut on the inner side of the type bars moving in succession past a latching pawl 140 which is adapted to stop the type bar in any one of its ten printing positions. Each of the pawls 140 cooperates with a latch 141 to which is attached a call wire 142 secured at the other end to an armature 143 which is swung when an associated printing magnet 144 is energized. Operation of latch 141 releases pawl 140 which then engages a notch 139. After the typebars 138 are stopped in their printing positions, the hammers 145 are released to strike the type carriers 146 mounted on the type bar, pressing them against the record paper 147 presented in front of the printing platen 148. Three type bars are provided for identifying the coinciding perforations presented on the analyzed cross-index cards. The numbers printed by the type bars will range from 0 to 999. Another set of type bars is provided for printing a record of the number of times coinciding perforations appeared on the cross index cards. These type bars are adapted to print totals under control of the accumulator for counting the items. A sample of a printed record sheet 147 is shown in Fig. 8.

The connections between the card sensing mechanism and the tabulating devices comprise a set of three emitting devices 149 such as shown in Fig. 2 and a numeral bar contact set up device 152 such as that shown in Figs. 5 and 7b. The brush holding arm 150 on the device shown in Fig. 2 is adapted to be rotated by its connection with shaft 134 in synchronism with the movement of the type bars 138, the frame being shown with a contact made between the "9" stud 151 which is the first one sensed as the frame rotates. The brush on arm 150 is adapted to successively engage the studs 151 in the contact ring as the related type bar 138 passes the various printing positions. If a circuit is completed through one of the studs 151 the associated printing magnet 144 is energized at the proper time to hold the type bar in printing position. The electrical connections between the tabulator controlled contact device 149 and the numeral contact device 152 under control of the record card carriages is shown in Fig. 7b. The mechanical construction of the numeral bar device 152, is shown in Fig. 5, while the wiring of the device is shown in Fig. 7b. In Fig. 5 it is noted that an insulating block 153 is secured to one of the racks 27 on the carriage controlling the movement of cross-index cards. Secured to the top of the insulated block 153 is a conducting contact strip 154 reaching across three rows of inserted metal contacts 155, 156 and 157, mounted on an insulation bar 158. Three extending fingers on the contact strip wipe over the contacts. The bar 158 is rigidly held to the stationary frame of the card shifting devices by a pair of brackets 159. The top contact 155 is a continuous strip reaching across the bar 158 horizontally. The second row of contacts 156 include ninety-nine separate contact members, arranged nine in a group with a slight space between the groups.

The third bottom row of contacts 157 are ten in number and are arranged with spaces between each other just as the groups of individual contacts in the row above. Each of the fingers on the conducting strip 154 contacts one of the rows of contacts, so that the two lower rows of contacts maintain an electrical connection with the plain rectangular contact 155. When the cards are brought into the first column analyzing position the three fingers on the conducting strip are brought slightly to the right of the contacts on the insulating bar 158. In this position no contact is made to energize the circuits through the brush holding arms 150 in any one of the emitting positions. If coinciding holes appear in the three cross-index cards at this initial position, a circuit through brushes 50 is energized and the sensing operation is suspended while a printing impression is made of the zero which is presented by the type on the type bar lifted to the highest position.

The escapement of the racks 27 to bring the second column on the cards over the analyzing brushes 50, serves through the connections noted to bring the fingers on the conducting strip 154 in position to establish a connection between the common conducting contact 155 and the first contact 156. As shown in Fig. 7b this serves to connect a circuit from one side of the line to a units order emitter stud 151 which is touched by the brush on the arm 150 to establish a circuit through the printing magnet 144 just as the associated type bar reaches the 1 position. Thus a numeral is printed indicating the position of coinciding perforations. In the manner described the conducting strip is drawn horizontally from one numeral setup contact to another as the cards are analyzed column by column. The wiring connections from the nine contacts 156 in each group to the related studs 151 in the emitter are plainly shown in Fig. 7b.

It is noted from the construction shown in Fig. 7b that when the tenth column on the card is analyzed, the middle finger of the conducting strip 154 rests on an insulated portion 160 of the bar 158 between the two upper groups of contacts 156, and at the same time the left contact finger engages the contact 157 which is connected with the "1" stud in the tens order emitter. The circuits are then conditioned to control the printing of 10.

In this way the 100 vertical columns on the record cards are analyzed, each analysis being made simultaneous with the setup of a numeral by contacts made along the bar 158. If coinciding perforations are analyzed, the sensing devices are disabled while printing takes place. The wiring of the nine contacts 157 to the related nine studs 151 in the tens emitter is shown in Fig. 7b.

At the end of the analysis of the first row of index points, the cards are brought back to start the sensing of the second row and it is desired to indicate that the analysis includes index points 100 to 199, inclusive. In order to indicate this by printing a numeral in the hundreds order in the tabulator a commutator 128 similar to the commutators 117 (Fig. 7c) described hereinbefore is mounted on the shaft 127, (Fig. 9). When the brush frames 119 are shifted from the first to the second row analyzing positions the brush frame 119 associated with the commutator 128 is moved to establish contact between the main line and the stud 151 in the "1" position on the hundreds order emitter 149 in the tabulator. By means of this connection, all numerals printed by reason of sensing coinciding perforations in the second row of index points will be accompanied by a number 1 in the hundreds position on the printed sheet. After the analysis of the second row of index points the brush holder 119 cooperating with the commutator 128 is moved to establish a circuit to the stud 151 representing "2" on the emitter.

In the above described manner the conducting strip 154 is drawn across the bar 158 ten times to direct numeral printing impulses through the units and tens emitters 149 while the brush holder 119 is stepped around the commutator 128 to properly direct the printing impulses through the hundreds order emitter 149 during the analysis of one set of record cards.

At the top of the view in Fig. 7a is shown the wiring diagram of the tabulating machine. Most of the connections shown are standard construction, and are fully described in Patent No. 1,762,145, issued June 10, 1930 to G. F. Daly et al. The tabulator operating controls, the printing mechanism, and the connections for resetting the accumulators and taking a total print therefrom are explained in the patent. For the purposes of the present description it is only necessary to point out that closing the switch PS will close a circuit to the power source through lines 161 and 162; depression of the tabulator start key 163 initiates an operation of the tabulator motor TM; and depression of reset key 164 serves to operate the reset motor RM for taking a totaling operation. Devices are provided for automatically initiating operation of the tabulator and reset motors under control of the card comparing devices. These devices for closing shunt circuits about the control key contacts will be described herein after consideration of the card comparing controls.

The wiring of the card comparing controls is shown in Fig. 7c. Starting at a point in the operation with card carriage rack 27 in the extreme left hand position (Fig. 5) the projection 112 on the rack contacts the insulated pin 113 to open contacts 115 and close contacts 114. In this position of the card carriage, the three new cards to be compared may be placed between the card shifter projections 26 and the doors 68 closed to hold the cards in position. When the doors 68 are latched the three contacts 71, Figs. 6 and 7c, are closed to condition part of the card comparing circuit.

In order to initiate the card comparing operation the magnet 95 must be energized to close the clutch between the motor 72 and the card return devices so that the three cards are brought in position with the first column of perforations above the sensing brushes 50. The circuit through magnet 95 runs from line 161, through wire 165, magnet 95, contacts 114 now closed, and then either through brushes 131 or contacts 166 to the other side of the line 162. It is recalled that as an incident to the sensing of the last row of perforations in the cards previously compared, disk 129 was turned in position to bring the insulated section under the brushes 131. The disk remained in this position while the cards to be sensed were placed in the receivers. Therefore, in order to complete the circuit, the comparison start key 132 is depressed and the contacts 166 closed.

When magnet 95 is energized, not only is the clutch connection made, but the brush holding frames 119 are stepped around in position to sense the "0" row on the cards, the disk 129 is advanced to complete the circuit through magnet 95 when the start key 132 is released, and contacts 107 (Fig. 6) are opened while contacts 111 are closed. The closing of contacts 111 completes a circuit through the card shift motor 72. The circuit is from line 161, through wire 167, motor 72, wire 168, contacts 111, and wire 169 to line 162.

The opening of contacts 107 breaks the circuit through brush magnets 67 during the card return movement. The brush magnet circuit includes, contacts 115 that are closed except when the card shift frame is in its last escaped position, contacts 71 normally closed, wire 170, magnets 67 arranged in multiple, wire 171, contacts 107 and wire 169 to line 162. When the cards are properly positioned to the right, contacts 107 and 111 are reversed by the tripping of latch 108 (Fig. 6) thus the card return motor is deenergized and the brush magnets are energized to bring the brushes 50 into sensing position.

The cards are drawn across the sensing brushes 50, column by column, until coinciding perforations are sensed on all the records, then the escapement mechanism is disabled until a tabulating and counting operation is effected after which the card movement is resumed. The electric circuit for controlling the escapement magnets 35 is conducted from the left side of the line 161, through contacts 115, contacts 71, tabulator controlled contacts 172 normally closed, wire 173, three sets of escapement magnets 35 and circuit breaking contacts 47, each magnet and associated contacts being wired in series, the sets being arranged in multiple in circuit with wire 174, armature 175, contact point 176 and wire 177 to line 162. As before explained, magnets 35 are alternately energized and deenergized by the automatic actuation of contacts 47. The escapement circuit is maintained until a card comparing circuit is made through magnet 178, then armature 175 is swung clear of point 176 breaking the card shifting circuit until magnet 178 is deenergized at the end of the recording operation.

The three record cards are compared at each index point position and when perforations are presented at the same point on all, an electric circuit is made through sensing brushes 50. The circuit runs from line 161 through contacts 115, 71, and 172, wire 179, extra brush 50 always in contact with roller 25, to contact roller 25. Here the connections may be interrupted by the record card separating all sensing brushes 50 from roller 25, or a perforation in the card may permit contact between the two, only one brush 50 is effective at a time, the selection being brought about by the positioning of frame 119 as explained in connection with Fig. 5. The circuit traced above continues from contact roller 25, through brush 50 to the segment 116, through the brushes on frame 119 to the common ring 120, then to the next card analyzing apparatus through a wire 121 attached to the common contact ring 120 and extra brush 50 on the second roller 25. From the second card sensing apparatus the series connection continues to the third card sensing apparatus by wire 122, then through the third card sensing means, wire 180, magnet 178, wire 181, tabulator controlled contacts 182 and wire 183 to line 162. Appearance of coinciding perforations at the sensed index-points on the record cards allows completion of the circuit and energization of magnet 178 which is constructed to attract armature 175 and armatures 184 and 185. Movement of armature 175 as explained before, serves to disable the escapement mechanism during tabulating. Shifting of armature 184 establishes a holding circuit through magnet 178; the circuit includes line 161, wire 186, tabulator controlled contacts 187, wire 188, contact point 189, armature 184, magnet 178, wire 181, contacts 182, and wire 183 to line 162. The movement of the other armature 185, closes a shunt circuit including wires 190, 191 and contact point 192, about the start key contacts 193 (Fig. 7a) in the tabulator.

As the tabulator operates, the card comparing and escapement circuits are controlled by the opening and closing of the contacts 172, 182 and 187. Contacts 172 are opened early in the tabulating cycle to break the circuits through the sensing brushes 50 and escapement magnets 35. Shortly after that the contacts 187 are opened momentarily, breaking the circuit around the tabulator start key contacts 193. Late in the tabulating operation contacts 182 are opened momentarily as contacts 172 are closed, thus the escapement magnets 35 may act to bring another set of index-points over the brushes 50 for sensing, before the previously sensed coinciding perforations can again act to initiate a tabulating operation.

When the tabulator is operated, the three numeral printing type bars 138 (Fig. 1) are raised in synchronism with the rotation of the three emitter arms 150. From the contact arrangement shown in Figs. 5 and 7b, and through the emitters 149, impulses are sent through the magnets 144 at the proper times to stop the type bars in position to print a number corresponding to the coinciding index points found perforated. The wiring through the printing magnets 144 terminates at one end as shown in Fig. 7a. There a connection is made from line 161 by wire 194 to the common contact brush 195, thence through contact roller 196, individual brushes 197, and printing magnets 144 wired to plug sockets 198, 199, and 200. In the highest order printing line a wire reaches from plug socket 200 to socket 203 in Fig. 7b, a wire 204 connects socket 203 to contact arm 150; the circuit continues through any of the contact studs 151 on the emitter to a contact segment 116 on ring 118, then through brush 119 to the common contact ring 120, wire 205 and wire 206 to the line 162. Thus the setting of the brush frame 119 determines the numeral printed in the hundreds order.

The commutator unit 128 is similar in construction to the three brush selecting commutator units 117 shown in Fig. 7c, and it is operated in a similar way by the pawl 124 (Fig. 5). However, the brush holder 119 in the hundreds bank of the printer control, is out of contact with the segments 116 on ring 118 at the beginning of a card sensing operation. It remains in this position during the comparing of the first row of index points on the records. Then, when three frames 119 in the commutators 117 are moved to sense the second row, the brush frame in commutator 128 mounted on the shaft 127 (Fig. 5) is shifted to make contact with the "1" segment 116 in readiness to print the hundreds order numeral in any of the numbers from 100 to 199. As the other rows on the cards are selected the brush frame 119 is moved in position to direct an impulse through the hundreds order printing magnet 144 at the proper time.

The circuit through the tens order printing magnet 144 continues along a plug wire between plug socket 199 (Fig. 7a) and socket 202 (Fig. 7b), wire 207 to brush 150, any of the studs 151, wire 208, contact 157, conducting member 154, contact bar 155 and wire 206 to line 162. The numeral to be printed is determined by whichever one of the contacts 157 is contacted by member 154 during a tabulating operation, and the position of the member in turn coincides with the position of a perforation along a row on the record card, since the card and member 154 are moved together. The first ten index point positions in a row on the cards sensed do not have a corresponding active contact 157. But as the card continues to move, from the sensing of the eleventh to the twentieth index point, conductor 154 contacts the "10" contact 157 (Fig. 7b). In a similar way the other contacts are successively engaged as the cards are shifted along.

The circuit through the units order printing magnet 144 is closed by a plug wire from plug socket 198 (Fig. 7a) to socket 201 in Fig. 7b, wire 209, brush 150, any of the studs 151, one of the wires 210, a contact section 156, conductor 154, contact bar 155 and wire 206 to line 162. The contacts 156 are arranged in groups of nine, each group containing nine sections each of which is connected by wire to one of said studs 151 in the units emitter. Nine out of every ten index point positions in a row on the card are represented by contacts 156. Between the groups of contacts there are insulated spaces 160 upon which the conductor 154 stands when one of the "0" index points along a row is being sensed. Thus between the contacts and spaces all the index points are accounted for and represented on the third emitter.

The devices for counting the number of times that coinciding perforations appear on the record cards, comprise a connection in the tabulating wiring to the well-known form of electric accumulating mechanism shown at the bottom of Fig. 7a. One form of this mechanism is illustrated in Patent No. 1,307,740 to C. D. Lake. Each time the tabulator is operated, a unit is added to the lowest order of the accumulator. The wiring connections reach from plug socket 211 to which counter magnet 212 is wired, through plug wire 213 to socket 214, wire 215, contacts 216 closed at "1" in the tabulating cycle by a cam mounted on the listing shaft 134, Fig. 1, and wire 217, Fig. 7a, to the side of the line 162. Thus an impulse is directed through magnet 212 in time to add a unit to the lowest order accumulator wheel. The regular form of carrying device transfers the count above nine to the higher order accumulator wheels.

The present invention includes a means for printing a total record of the number counted on the accumulator, and resetting the accumulator if desired. This operation is performed by actuation of reset motor RM, Fig. 7a, in the usual way. Contact arms 218 are moved in synchronism with the rising counter typebars 138, the stopping of the typebars being determined by the energization of magnets 219 when contact is made between the contact arms 218 and the snail cams 220 mounted on the accumulator wheels. The total printing operation is controlled so that it occurs after a complete comparison of all the index points on the record cards. The total and reset control circuit is shown at the lower end of Fig. 7b. The circuit includes a pair of brushes 221 normally resting on an insulation ring 222 on a disc 223. This disc is fastened to the shaft 127 (Fig. 9) and is rotated one step upon change of rows during the comparing operation, just as disc 129 is rotated. When the ninth or last row is conditioned for comparison a conducting segment 224 on disc 223 is brought around in position to close the circuit through brushes 221. The circuit is not entirely closed, however, until the space between two contact spots 225 and 226 is bridged. These spots are located at the end of the first and second row of contacts, on the insulated bar 158, see Fig. 5. When the conducting member 154 passes from the ninety ninth or last comparing position, it contacts the two spots 225, 226 and closes the reset control circuit. The circuit runs from line 161, wire 227, spot 225, conductor 154, spot 226, wire 228 through brushes 221 and segment 224, relay contacts 229, wire 422, relay magnet 230 (Fig. 7a) and wire 423 to the other side of the line 162. When magnet 230 is energized, associated contacts 231, Fig. 7a, are operated to close a shunt circuit across the reset key contacts 232. The reset motor RM then operates the usual total printing and resetting mechanism, shown in detail in Patent No. 1,762,145 mentioned hereinbefore.

During the resetting operation relay magnet 233 is energized. Its associated contacts 229, Fig. 7b, are then opened to break the reset control circuit. The contacts are held apart by a latch 234 cooperating with contact leaf spring 235, thus limiting the resetting operation to one cycle. When the comparing start key 132 is depressed, latch 234 is operated to release contact leaf 235 allowing the closing of contacts 229. The cooperation between key 132 and latch 234 is delayed so that disc 223 may rotate slightly to break the reset control circuit at the brushes 221 before it is closed at the contacts 229. A complete card comparing operation may then be performed before the reset control is again effective to print a total of the number of agreeing comparisons counted, and reset the counter.

If instead of resetting the counter it is desired that the number printed remain on the counter as a running or sub-total, the selective reset mechanism shown in the patent to C. D. Lake et al., 1,775,132, Sept. 9, 1930, may be employed.

In this specification there are disclosed the fundamental novel features of the invention as applied to a single modification; it will be understood that various omissions and substitutions and changes in the form and details of the device illustrated and in its operation may be made by those skilled in the art without departing from the spirit of the invention. It is the intention, therefore, to be limited only as indicated by the scope of the following claims.

I claim:

1. In a record card controlled machine, a counting device, card moving devices, a card analyzing and comparing means cooperating with a set of cards, means under control of said analyzing and comparing means for disabling said moving devices to allow time for operating said counting device when agreeing perforations are sensed in the cards, means under control of said analyzing and comparing means for operating the counting device to count the number of times agreeing perforations are found in the set of record cards, and means under control of said last mentioned means for making said moving devices effective again after each counting operation.

2. In a record comparing machine, an analyzing and comparing means for sensing a group of records simultaneously index point by index point for indicia made at certain index points including means for shifting said records back and forth, means for making the rows of index point positions effective seriatim so that said analyzing and comparing means may sense indicia in row after row of index points, means for disabling said analyzing and comparing means as the records are shifted back for the sensing of a new row of index points, a counter, and means under control of said analyzing and comparing means for operating said counter to add a unit when coinciding indicia are sensed on the group of records.

3. In a machine controlled by record cards having index point positions arranged in rows and vertical columns, a comparing means comprising a plurality of sets of analyzing brushes one set for each card and each set in cooperation with a column of index points, means for making the brushes in each set effective for comparing seriatim, means for shifting the cards point by point relative to said brushes, means for disabling said shifting means when the effective brushes analyze coinciding perforations in the cards, a counting device, means under control of said comparing means for making said counting device effective to add a unit when coinciding perforations are analyzed, and means for enabling said shifting means to resume operation after operation of said counting device.

4. In a machine for comparing sets of record cards each card representing a certain characteristic and containing a plurality of index point positions each representing a case with the characteristic of the card, a comparing means for sensing corresponding index positions on a set of cards for coinciding perforations, means for moving the cards so that position after position is brought under the comparing means, means for suspending sensing operation when coinciding perforations are sensed, means under control of said comparing means for printing a number identifying the case position with coinciding perforations, means under control of said sensing means for counting a unit for each set of coinciding perforations, means under control of the card moving means for initiating a total taking operation after all index point positions have been sensed, and means under control of the counting means for printing the total count of cases having all characteristics.

JAMES WARES BRYCE.